US009394382B2

(12) United States Patent
Bell et al.

(10) Patent No.: US 9,394,382 B2
(45) Date of Patent: Jul. 19, 2016

(54) PROCESS AND APPARATUS FOR THE POLYMERISATION OF OLEFINS

(75) Inventors: Andrew David Bell, Carry-le-Rouet (FR); Jean-Louis Chamayou, Carry-le-Rouet (FR); Kevin Peter Ramsay, West Lothian (GB)

(73) Assignee: INEOS SALES (UK) LIMITED, Lyndhurst, Hampshire (GB)

( * ) Notice: Subject to any disclaimer, the term of this patent is extended or adjusted under 35 U.S.C. 154(b) by 400 days.

(21) Appl. No.: 13/988,794

(22) PCT Filed: Dec. 14, 2011

(86) PCT No.: PCT/EP2011/072701
§ 371 (c)(1),
(2), (4) Date: May 22, 2013

(87) PCT Pub. No.: WO2012/084628
PCT Pub. Date: Jun. 28, 2012

(65) Prior Publication Data
US 2013/0253148 A1    Sep. 26, 2013

(30) Foreign Application Priority Data

Dec. 20, 2010  (EP) ..................................... 10195898

(51) Int. Cl.
*C08F 2/34* (2006.01)
*B01J 8/24* (2006.01)
*B01J 8/44* (2006.01)
*C08F 10/00* (2006.01)
*C08F 110/02* (2006.01)

(52) U.S. Cl.
CPC . *C08F 2/34* (2013.01); *C08F 10/00* (2013.01); *C08F 110/02* (2013.01)

(58) Field of Classification Search
CPC .............. C08F 2/34; C08F 10/00; B01J 8/24; B01J 8/44
USPC .................................................. 526/68, 920
See application file for complete search history.

(56) References Cited

U.S. PATENT DOCUMENTS

| 5,417,930 | A | 5/1995 | McDonald, Jr. et al. |
| 6,469,103 | B1 | 10/2002 | Jain et al. |
| 6,911,504 | B2 * | 6/2005 | Reiling .................. B01J 8/0055 422/132 |
| 7,601,303 | B1 | 10/2009 | Karer et al. |
| 2006/0094837 | A1 | 5/2006 | Dooley et al. |

FOREIGN PATENT DOCUMENTS

| EP | 0 040 992 A1 | 12/1981 |
| EP | 0 824 115 A1 | 2/1998 |
| GB | 1 413 613 A | 11/1975 |
| WO | WO 00/61278 A1 | 10/2000 |
| WO | WO 01/94900 A1 | 12/2001 |
| WO | WO 2008/010911 A1 | 1/2008 |
| WO | WO 2009/085109 A2 | 9/2009 |

OTHER PUBLICATIONS

Radiometric Solutions, Petrochemical Industry, Polyethylene Borstar; "Level measurement in Gas Phase Reactors using density profiling"; Endress+Hauser, pp. 1-16 (2009).
Butterworth, D.; "Introduction to Heat Transfer"; Engineering Design Guides, *Published for the Design Council, the British Standards Institution and the Council of Engineering Institutions by Oxford Press*; 7 pages (1977).

* cited by examiner

*Primary Examiner* — Fred M Teskin
(74) *Attorney, Agent, or Firm* — Nixon & Vanderhye P.C.

(57) ABSTRACT

Process for gas phase polymerization of olefins in a fluidized bed reactor by (a) passing a fluidizing gas containing at least one olefin monomer through a fluidized bed of polymer particles in the presence of a polymerization catalyst to produce polymer at a polymer production rate of C Tonnes/hour, (b) withdrawing a first gaseous stream containing solid particles from the top of the reactor, (c) passing the first gaseous stream to a gas/solids separator, separating solid particles therefrom, and forming a second gaseous stream containing residual solid particles, (d) passing a portion of the second gaseous stream to at least one heat exchanger to remove heat of reaction whereby residual solid particles contact the heat exchanger, and (e) recycling a portion of the cooled stream from step (d) as the fluidizing gas in step (a). The heat exchangers have a heat exchange surface area which totals less than $120 \times C$ m$^2$.

9 Claims, No Drawings

PROCESS AND APPARATUS FOR THE POLYMERISATION OF OLEFINS

This application is the U.S. national phase of International Application No. PCT/EP2011/072701 filed 14 Dec. 2011 which designated the U.S. and claims priority to European Patent Application No. 10195898.1 filed 20 Dec. 2010, the entire contents of each of which are hereby incorporated by reference.

The present invention relates to a process and apparatus for the gas-phase polymerisation of olefins in a fluidised bed reactor.

BACKGROUND OF THE INVENTION

The polymerisation of olefin monomers in the presence of catalysts in fluidised bed reactors is well-known. In the fluidised bed polymerisation of olefins the polymerisation is conducted in a fluidised bed reactor wherein a bed of polymer particles is maintained in a fluidised state by means of an ascending gas stream comprising the gaseous olefin. During the course of polymerisation, fresh polymer is generated by the catalytic polymerisation of the olefin, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid.

The ascending gaseous stream, having passed through the reactor, is withdrawn from the top of the reactor. Given that only a portion of the olefin or olefins reacts when passing through the reactor, the process comprises a recycling loop by which the ascending gas stream withdrawn at the top part of the reactor is recycled to the base. Further, since the polymerisation reaction is highly exothermic the recycling stream is generally cooled to remove the heat of reaction. Current commercial operation generally prefers that the recycle stream is cooled such that a portion thereof condenses to form liquid, and this liquid is also reintroduced into the reactor, either below the fluidisation grid with recycled gas or directly into the reactor, the vaporisation of the liquid in the bed consuming significant quantities of the heat of reaction. Such operation is generally termed "condensed mode" operation.

The polymer particles form by reaction of monomer to form polymer on the catalyst particles, which thus increase with size during reaction. Thus, in a continuous process catalyst is withdrawn with the formed polymer particles, and fresh catalyst must be added to replace it. The particles in the fluidised bed can therefore include a range of particles ranging from relatively small particles which are based on catalyst which has not yet had time to grow to form larger particles on which more polymer has formed. It is also the case that relatively small particles can be present which have been formed by fragmentation of larger particles.

In order to minimise the entrainment of particles out of the reactor, the upper part of the reactor, generally a zone above the fluidised bed in operation, typically comprises a section of expanded cross-section, commonly known as a disengagement chamber, the expansion of which causes a reduction in the velocity of the ascending gas stream above the fluidised bed and which allows entrained particles to fall back into the fluidised bed.

Despite the presence of the disengagement chamber significant quantities of smaller particles are nevertheless withdrawn from the top of the reactor in the gas stream.

These particles can be deposited and foul the reactor loop, for example in heat exchangers, compressors and at the fluidisation grid. The fouling is a result of continuing polymerisation under non-favourable conditions (particles at rest with poor heat exchange), and manifests itself most severely as increases in pressure drop through heat exchangers and other components, and reductions in heat transfer across the walls of the heat exchangers.

This fouling can be very severe and can result in it being necessary to shut-down the reactor very regularly (every few months) to clean heat exchangers or other process equipment which has been exposed to the fine particles.

In order to mitigate the problem of fouling, it is also known for the recycling loop to comprise at least one gas/solid separator, preferably a cyclone, capable of separating, from the gas stream, a substantial portion of the solid particles entrained within it. The solids can then be returned to the reactor, and the rest of the gas stream cooled and recycled as already described.

Despite the presence of the disengagement chamber and a gas/solid separator the gas stream circulating in the loop will still generally contain some solid particles, often referred to as "fines", and fouling generally still occurs, albeit over a longer timescale than without a cyclone or other gas/solid separator.

A number of further solutions have been proposed to the problem of fouling, especially of heat exchangers.

For example FR-A-2,634,212 provides for injecting a liquid hydrocarbon upstream of a heat exchanger, in order to wash and clean the interior of the exchanger.

Furthermore, WO 98/20046 provides for the introduction, at one or more points in the loop, of an agent which prevents the deposition of polymer particles, and US 2006/094837 seeks to prevent fouling by careful control of the surface temperature of the heat exchanger relative to the dew point of the gas stream, effectively "wetting" the surface.

WO 00/61278 relates to a heat exchanger of a particular design which seeks to prevent the deposition of the fine particles by design of the flow of the gas stream.

Despite all of the above, it has generally been the case that it still periodically becomes necessary to shut-down the polymerisation process to clean heat exchangers or other process equipment which has been exposed to the fine particles.

DESCRIPTION OF THE INVENTION

In contrast, the present Applicants have now been able to operate a polymerisation process which is characterised by negligible fouling rates, even though some fine particles are present in the recycle stream. Such processes do not require shut-down to clean heat exchangers, even after several years of operation.

Thus, in a first aspect the present invention provides a process for the gas phase polymerisation of olefins in a fluidised bed reactor, which process comprises:

a) passing a fluidising gas comprising one or more olefin monomers through a fluidised bed of polymer particles in the presence of a polymerisation catalyst, b) withdrawing a first gaseous stream comprising solid particles from the top of the reactor, c) passing the first gaseous stream to a gas/solids separator, separating solid particles therefrom, and forming a second gaseous stream comprising residual solid particles, d) passing at least a portion of the second gaseous stream to one or more heat exchangers to remove the heat of reaction, and e) recycling at least a portion of the cooled stream from step (d) as the fluidising gas in step (a), characterised in that the rate of fouling of the one or more heat exchangers is such that i) the increase in pressure drop across the heat exchangers is equivalent to less than 5% per year, and/or ii) the decrease in heat transfer of the heat exchangers is equivalent to less than 5% per year.

The fluidised bed reactor generally comprises a vertically orientated cylindrical reaction zone, which in use contains the fluidised bed of polymer particles, which has a fluidisation grid at its base, and above which is located an expanded section in the form of an expanded cylindrical section or an inverted cone, which is generally referred to as a disengagement zone. The fluidising gas is passed upwardly through the fluidisation gird, through the reaction zone and the disengagement zone, and then withdrawn from the top of the reactor, usually from the top or close to the top of the disengagement zone. Such reactors are well-known and widely operated.

The heat exchangers act to remove heat of reaction. Generally, the one or more heat exchangers of step (d) remove the majority of, and preferably substantially all of the heat of reaction within the second gaseous stream. However, other cooling steps can be provided.

Preferably, the increase in pressure drop across the heat exchangers is equivalent to less than 5% per year and the decrease in heat transfer of the heat exchangers is equivalent to less than 5% per year.

Preferably, the rate of fouling of the one or heat exchangers is such that the increase in pressure drop across the heat exchangers is equivalent to less than 3% per year, preferably less than 1% per year.

Similarly, preferably the rate of fouling of the one or heat exchangers is such that the decrease in heat transfer of the heat exchangers is equivalent to less than 3% per year, preferably less than 1% per year.

With the fouling rates of the present invention, plants can be operated for in excess of 1 year, more particularly in excess of 2 or 3 years, and even 5 or more years without it being necessary to shut-down to clean the heat exchangers. Similarly it is not necessary to shut-down to clean compressor(s) or the fluidization grid over the same time-scales.

Changes in pressure can be relatively easily determined in order to measure pressure drop. However, to compare pressure drop with time according to the present invention it is necessary to compare pressure drops under comparable conditions (gas density and velocity).

In one aspect this can be done by periodically switching to a "standard" set of conditions with specific gas density and velocity.

Alternatively, measured pressure drop under a particular set of conditions can be compared to measured pressure drops under other conditions by "normalising" for gas density and velocity at the measured conditions.

As used herein, normalised pressure drop ($DP_n$) is determined as follows:

$$DP_n = DP_m / (\rho_{gas} * v^2),$$

where $DP_m$ = measured pressure drop, $\rho_{gas}$ = gas density at the heat exchanger inlet conditions, and $v$ = gas velocity at the inlet conditions.

The relative change in pressure drop versus time can then be determined as the ratio of $DP_m/(\rho_{gas}*v^2)$ after a period of time, t, compared to the ratio $DP_m/(\rho_{gas}*v^2)$ at the beginning of the period of time.

Gas density (in kg/m$^3$) should be determined using the following equation:

$$\rho_{gas} = (P * MM_g) / (T * R * Z)$$

where

P is the gas pressure in Pa (abs),

T is the gas temperature in ° K,

R is the Universal gas constant (=8314 Pa m$^3$/kmol ° K.),

Z is a compressibility factor, and $MM_g$ is the mean molecular mass of the gas in kg/kmol.

Z is typically between 0.9 and 1.01 and should be determined by the resolution of the Peng-Robinson cubic equation of state as described in Reid R. C., Prausnitz J. M., Poling B. E., "The properties of gases and liquids" (4th ed., MGH, 1987) (ISBN 0070517991).

$MM_g$ is determined by analysis of the gas to determine the composition in vol % of each component (i), for example using gas chromatography, and then averaging based on the molecular weight ($MW_i$) of each components and its measured vol % (vol %$_i$) i.e. ($\Sigma$ [vol %$_i$ * $MW_i$])/($\Sigma$ vol %$_i$)

Gas velocity can be determined by measuring the gas mass flow rate under the inlet conditions using a venturi flow meter, converting this to a volumetric flow rate using the gas density, and dividing this by the pipe cross-section at the inlet to the heat exchanger to obtain a linear velocity at the inlet. Alternatively it can be derived from flow rate measurements at other locations, for example based on the fluidisation velocity in the reactor and the relative diameters of the reactor and the heat exchanger inlet.

The units used for density and velocity are not critical since they will also cancel in determining the relative change in pressure drop versus time. Typically, however, gas velocity is determined in m/s and gas density in kg/m$^3$.

The change in heat transfer of the heat exchangers with time is a relative number and hence may be determined by any suitable method. Preferably, however, the heat transfer of the heat exchangers is calculated as the heat exchange coefficient (U) where:

$$U = \frac{Q}{A \times (dT)\mathrm{lm}}$$

And

Q being the heat transferred from hot fluid to cold fluid,

A being the heat exchange surface area (m$^2$) and (dT)lm being the logarithmic mean temperature difference.

(dT)lm is itself calculated from the temperatures (T) of the gas stream (G) and cooling fluid (CF) entering ("in") and exiting ("out") the heat exchanger as follows (all temperatures being in ° C.):

$$(dT)\mathrm{lm} = \frac{[(T_{Gin} - T_{CFout}) - (T_{Gout} - T_{CFin})]}{\left(\ln\left[\frac{(T_{Gin} - T_{CFout})}{(T_{Gout} - T_{CFin})}\right]\right)}$$

Q is calculated as [m Cp dT] with m=mass flow rate of the cooling fluid, Cp=specific heat of the cooling fluid, and dT=$T_{CFout}$−$T_{CFin}$(° C.)

Preferably the cooling fluid is water. The specific heat of a substance is a well know property and can be looked up in the literature. Suitable values for the present invention are those found in Perry, Chemical Engineers Handbook, 7th Edition (1997), Chapter 2, Tables 2-352, 2-353 and pp 306-308.)

(Q can also be calculated as [m Cp dT] using the process gas.)

The present invention is preferably operated in what is termed the "condensing mode" wherein a portion of the gas exiting the reactor is cooled below its dew point such that condensation of condensable components therein occurs to form a liquid, and this liquid is introduced into the reactor. In condensing mode operation the heat exchange coefficient (U) is higher than when operated without condensing, for example above 500 W/m$^2$/° C., and especially above 650 W/m$^2$/° C.

In the present invention, the polymerisation process may be operated in condensing mode and for in excess of 3 years, preferably for 5 or more years, with a heat exchange coefficient (U) of the one or more heat exchangers of greater than 650 W/m$^2$/° C. (without cleaning of the heat exchangers).

A further advantage of the heat exchangers retaining a high heat exchange coefficient without requiring cleaning is that a smaller heat exchanger can be used for a particular plant capacity since it is not necessary to allow for the loss of heat exchange efficiency by "over-sizing" the heat exchanger.

Thus, in another aspect the present invention provides a process for the gas phase polymerisation of olefins in a fluidised bed reactor, which process comprises:

a) passing a fluidising gas comprising one or more olefin monomers through a fluidised bed of polymer particles in the presence of a polymerisation catalyst to produce polymer at a polymer production rate of C Tonnes/hour, b) withdrawing a first gaseous stream comprising solid particles from the top of the reactor, c) passing the first gaseous stream to a gas/solids separator, separating solid particles therefrom, and forming a second gaseous stream comprising residual solid particles, d) passing at least a portion of the second gaseous stream to one or more heat exchangers to remove the heat of reaction, and e) recycling at least a portion of the cooled stream from step (d) as the fluidising gas in step (a), characterised in that the one or more heat exchangers have a heat exchange surface area which totals less than 120×C m$^2$.

Further, in yet another aspect, the present invention provides an apparatus for the gas phase polymerisation of olefins in a fluidised bed reactor having a maximum designed production capacity of C Tonnes/hour, which apparatus comprises:

a) a fluidised bed reaction zone b) an outlet located at the top of the reaction zone for withdrawing a first gaseous stream comprising solid particles from the top of the reactor, c) a gas/solids separator for separating solid particles from the first gaseous stream to form a second gaseous stream comprising residual solid particles.

d) one or more heat exchangers to which at least a portion of the second gaseous stream is passed, and e) a recycle line for recycling at least a portion of the cooled second gaseous stream as the fluidising gas to the fluidised bed reaction zone, characterised in that the one or more heat exchangers have a heat exchange surface area which totals less than 120×C m$^2$.

Preferably, the fluidised bed reaction zone is a vertically orientated cylindrical reaction zone having a diameter (DI) of at least 4.5 m, which has a fluidisation grid at its base, and above which is located a disengagement zone in the form of an expanded cylindrical section or an inverted cone, wherein the disengagement zone has a maximum horizontal cross-sectional area, A2, which is between 3.2 and 6 times the cross-sectional area, A1, of the cylindrical reaction zone. The capacity (C) is preferably at least 40 tonnes/hour, for example at least 50 tonnes/hour and/or up to 80 tonnes/hour.

Preferably the one or more heat exchangers have a heat exchange surface area which totals less than 100×C m$^2$, for example in the range 50 to 100×C m$^2$.

The second gaseous stream (exiting the gas/solids separator) should be passed directly to the one or more heat exchangers i.e. with no intermediate pieces of equipment, such as compressors, which might be exposed to the stream before the heat exchangers.

According to the present invention, a gas/solids separator is used to separate solid particles from the first gaseous stream exiting the reactor. However, as described further below, 100% solids separation is not required, and thus, the second gaseous stream comprises residual solid particles and these particles are allowed to contact the heat exchanger.

In fact, whilst it may be theoretically desirable to remove all solids from the first gaseous stream this is generally difficult to do. The use of filters to remove fines is suggested, for example, by GB 1413613. However, the filter mechanism is based on the principle that the surface area available is such that the gas can pass through but the solid particles are blocked by the fine mesh of the filter. By its intrinsic design, a filter will stop the motion of the solid particles. However, in a polymerisation process, these particles are still highly active, and polymerisation will almost immediately occur if left stagnant in a polymerisation environment (presence of monomer and co monomer in the first gaseous stream). This will block the filter and force the plant to shut.

Thus, the gas/solids separators that are compatible with a polymerisation process are separators that maintain movement of the solids, such as cyclones.

Thus, according to the present invention, the second gaseous stream comprises residual solid particles. In the present invention at least some of these particles are allowed to contact the one or more heat exchangers i.e. the portion of the second stream which contacts the one or more heat exchangers still comprises residual solid particles.

The present invention thus generally precludes the presence, between the gas/solids separator and the one or more heat exchangers, of means, such as filters, which completely remove the solids from the second gaseous stream.

Most preferably the second gaseous stream is passed directly to the one or more heat exchangers, by which is meant that the connection between the gas/solids separator and the one or more heat exchangers may comprise connecting pipework but no other intermediate pieces of equipment.

Without wishing to be bound by theory, the present invention is believed to result from a thorough understanding of the nature of the fine particles which cause fouling, allowing the process to be designed and operated to avoid detrimental fines whilst not having to remove all fines from the second gaseous stream.

The process of the present invention further does not require the addition of liquid or additives prior to the heat exchanger such as described in FR-A-2,634,212 or WO 98/20046, nor the specific wetting conditions of US 2006/094837, and yet still provides a process without appreciable fouling.

In fact, contrary to the teaching of US 2006/094837 which teaches that low gas velocities are advantageous in ensuring "wetting" of surfaces, it has been found that it is advantageous to maintain relatively high linear velocities through the heat exchangers in the present invention, preferably of at least 3 m/s, more preferably of at least 5 m/s, such as in the range 5 to 20 m/s.

A feature which can contribute to the present invention is to ensure that the majority of the particles, by number, that are passed to the heat exchanger have a particle size of less than 20 microns, and in particular to control the amount of such particles that derive from fragmentation of larger polymer particles.

The particle size can be controlled by the efficiency of the gas/solids separator. Gas/solids separators may be rated by how many particles they remove, for example, a "perfect" gas/solids separator would have an efficiency of 100% and no particles would be present in the gas stream exiting it. In practise, the efficiency with which a particle is separated decreases as the particle size decreases, and thus gas/solids separators may be rated according to the efficiency or efficiencies by which particles of particular size(s) are removed. In the present invention it is not necessary to maximise the efficiency, but the gas/solids separator should be operated to minimise the number of particles which do pass through which are larger than a defined particle size.

As used herein the gas-solids separator should have a cut size of 20 microns, the "cut size" being defined herein as the size of particles which are removed with 50% efficiency from the separator (based on single particle collection efficiency). Larger particles are generally removed more effectively and smaller particles less effectively. Preferably, the gas-solids separator has an efficiency of 95% or more for particles of 50 microns and above (based on single particle collection efficiency).

As used herein single particle cyclone efficiency for a particular particle size can be determined according to the methods taught by Perry, Chemical Engineers Handbook, 7th Edition (1997), Chapter 17, p 17-27 to 17-29.

The gas/solids separator preferably comprises one or more cyclones, and most preferably consists of one or more cyclones, for example operated in series or in parallel. Preferably, the gas/solids separator is a single cyclone. The one or more cyclones may be provided with suitable cyclone internals to stabilise the cyclonic vortex, and may be used in conjunction with an ejector at the base of the cyclone to efficiently recover the separated fines.

Suitable cyclone internals are described, for example, in EP 10151642.5.

Ejectors are described, for example, in U.S. Pat. No. 4,882,400

In particular, the Applicant has found that fouling can be correlated to the numbers of relatively "soft" particles. At low particles sizes the particles are either relatively small particles that have not yet had time to grow to form larger particles or derived from fragmentation of larger particles.

The small particles which have not yet had time to grow tend to retain the characteristics of the catalyst support, usually silica, which is relatively hard. Surprisingly, considering that such particles are actually very active as catalysts, it has been found they do not contribute significantly to fouling.

By removing larger particles which can contribute significantly to fouling then fouling is significantly reduced.

Further, it is also the case that small particles can be formed by fragmentation of larger particles. Such particles tend to be "softer" than particles which have not yet had time to grow, and can also cause significant fouling. In the present invention the presence of these particles in the second gaseous stream can be minimised by careful control of the polymerisation process to prevent fragmentation of the larger particles. This includes carefully defined operating windows, such as disclosed in WO 03/93332, and start-up procedures, such as disclosed in WO 05/07711.

Other factors which can contribute to the various aspects of the present invention include:
1) Well defined catalyst support particles. The use of support particles with relatively high sphericity produces polymer particles which are less prone to entrainment and also easier to separate in the gas/solids separator. Sphericity is a measure of the difference in the particle shape relative to a sphere. Sphericity can be measured by taking a microscopic photograph of a powder sample. A sample of particles is selected at random and for each particle in the sample, the lengths of the major (L max) and the minor (L min) axes for the best fitting ellipse are measured. The shape factor is then calculated as the average ratio of the Lmin/Lmax over the selected particles. For perfect spheres the ratio is 1, and reduces as the sphericity reduces. Preferably the sphericity as determined from this method is at least 0.7.
2) Solids separated from the first gaseous stream in the gas/solids separator are returned to the base of the fluidised bed, which limits their re-entrainment. Such a process is described, for example, in EP 10151642.5
3) Nucleonic level control on the fluidised bed itself ensures accurate control of the bed height, reducing the possibility of undetected increases in bed height. Such systems are well-known, for example as supplied by Berthold Technologies GmbH & Co KG, Germany, or Ohmart/VEGA Corporation, US.
4) A relatively large disengagement zone diameter may be used to minimise the entrainment out of the reactor. Suitable disengagement zones for large reactors are described in WO 2010/037653. As described therein, the disengagement zone has a maximum horizontal cross-sectional area, A2, which is between 3.2 and 6 times the cross-sectional area, A1, of the reaction zone.
5) Probes may be used to monitor fines in the first gaseous stream and/or in the second gaseous stream, and process operating conditions may be altered e.g. bed height or fluidisation velocity, if these show abnormal quantities of fines exiting the reactor or the gas/solids separator.

A significant advantage of the present invention is the ability to operate a polymerisation process to produce different grades at significantly varying reaction temperatures whilst avoiding fouling of the heat exchangers. In general different grades can be produced at different reaction temperatures, but an important factor is that the reaction temperature for a particular grade should be suitably far below the melting temperature of that particular grade. For example, a low density polyethylene grade may be produced at 80-90° C. in the reactor whereas a high density polyethylene grade may be produced at above 110° C. In general, the inlet of the heat exchanger is at a temperature related to the reaction temperature i.e. it is higher when reaction temperature is higher. It is therefore the case that when producing grades at "high temperature" the inlet to the heat exchanger may be at a temperature above the melting temperature of grades produced at lower temperatures. In a polymerisation campaign where a number of grades are produced powder deposits on the heat exchangers of grades produced at lower temperatures can melt when a subsequent grade is produced at higher temperatures. This can significantly accelerate fouling. In the process of the present invention it is possible to produce grades having significant variations in melting temperatures over a wide range of reaction temperatures without fouling.

Thus, in another aspect the present invention provides a process for the gas phase polymerisation of olefins in a fluidised bed reactor, which process comprises:

a) passing a fluidising gas comprising one or more olefin monomers through a fluidised bed of polymer particles in the presence of a polymerisation catalyst at a first temperature. TR1, to produce a first polymer,
b) withdrawing a first gaseous stream comprising solid particles from the top of the reactor,
c) passing the first gaseous stream to a gas/solids separator, separating solid particles therefrom, and forming a second gaseous stream comprising residual solid particles,
d) passing at least a portion of the second gaseous stream to one or more heat exchangers to remove the heat of reaction, at the point of first contact with the one or more heat exchangers the second gaseous stream having a temperature, TH1 and
e) recycling at least a portion of the cooled stream from step (d) as the fluidising gas in step (a), and
f) transitioning the reaction in the fluidised bed reactor to one comprising steps (a) to (e) as above except that step (a) is operated at a second temperature, TR2, to produce a second polymer, and that at the point of first contact with the one or more heat exchangers the second gaseous stream has a temperature, TH2, TR2 being higher than TR1 and TH2 being higher than TH1,
characterised in that TH2 is above the melting temperature of the first polymer.

This aspect of the invention arises from the fact that there is essentially no significant fouling of the heat exchangers by polymer powder which would otherwise lead to the problems of melting thereof.

In one embodiment, the process may be transitioned to step directly from production of the first polymer to production of the second polymer. Alternatively, one or more other polymers may be produced in between. For example, it may be that the process is operated to sequentially produce polymers at progressively increased reaction temperature (TRi), and only later polymers in the sequence lead to a temperature (TH2) higher than the melting temperature of the first polymer. One of these later polymers is then considered as the "second polymer" according to the claim.

The melting temperature of a polymer as defined herein is the temperature, as measured by Differential Scanning Calorimetry on the dry powder, at which 15% of the polymer has melted. The Differential Scanning Calorimetry should be performed according to ASTM D3418-08, "Standard Test Method for Transition Temperatures and Enthalpies of Fusion and Crystallization of Polymers by Differential Scanning Calorimetry".

The features of this aspect of the invention (e.g. preferred cut size, fouling rates) are generally as for the other aspects of the invention as described herein.

It is also a feature of the present invention that, by careful control of the fines in the recycle loop, fouling of other parts of the recycle loop downstream of the heat exchangers and also of the fluidisation grid at the base of the reactor by recycled fines is avoided.

Thus, preferably, the invention may also be characterised in that:
the rate of fouling of a fluidisation grid located at the base of the fluidised bed in the reactor is such that increase in pressure drop across the grid is equivalent to less than 5% per year, and/or
the rate of fouling of a compressor located in the recycle loop, as measured by the increase in temperature differential across the compressor is such that the increase is equivalent to less than 5% per year.

The rate of fouling of the downstream equipment/fluidisation grid may be further reduced by the use of a gas liquid separator which allows condensed liquid to be reinjected directly into the reactor. Such a process is described in EP0699213B1. The gas liquid separator is typically very efficient and separates at least 99 wt % of the liquid in the stream entering the separator therefrom. Fines present are preferentially entrained in the liquid rather than the gas phase, reducing their ability to foul other pieces of equipment or the fluidisation grid.

Typically, the gas liquid separator will remove in the liquid phase all particles greater than 10 microns from the stream entering the separator.

Fouling may also be reduced by operating the heat exchanger gas inlet, and the compressor outlet at no higher a temperature than the reactor gas exit stream. Preferably the compressor outlet is at least 10° C., more preferably at least 20° C., degrees cooler than reactor outlet.

The invention claimed is:

1. A process for the gas phase polymerisation of olefins in a fluidised bed reactor, which process comprises:
a) passing a fluidising gas comprising one or more olefin monomers through a fluidised bed of polymer particles in the presence of a polymerisation catalyst to produce polymer at a polymer production rate of C Tonnes/hour,
b) withdrawing a first gaseous stream comprising solid particles from the top of the reactor,
c) passing the first gaseous stream to a gas/solids separator, separating solid particles therefrom, and forming a second gaseous stream comprising residual solid particles,
d) passing at least a portion of the second gaseous stream to one or more heat exchangers to remove heat of reaction, wherein residual solid particles contact the heat exchanger, and
e) recycling at least a portion of the cooled stream from step (d) as the fluidising gas in step (a),
wherein the one or more heat exchangers have a heat exchange surface area which totals less than $120 \times C$ m$^2$.

2. A process according to claim 1 wherein the linear velocity of the second gaseous stream through the one or more heat exchangers is at least 3 m/s.

3. A process according to claim 2 wherein the linear velocity of the second gaseous stream through the one or more heat exchangers is in the range 5 to 20 m/s.

4. A process according to claim 1 wherein the cut size of the gas/solids separator is 20 microns.

5. A process according to claim 1 wherein the fluidised bed reactor comprises a vertically orientated cylindrical reaction zone, above which is located a disengagement zone, and the disengagement zone has a maximum horizontal cross-sectional area, A2, which is between 3.2 and 6 times the cross-sectional area, A1, of the cylindrical reaction zone.

6. A process according to claim 1 the rate of fouling of a fluidisation grid located at the base of the fluidised bed in the reactor is such that increase in pressure drop across the grid is equivalent to less than 5% per year.

7. A process according to claim 1 wherein the rate of fouling of a compressor located in the recycle loop, as measured by the increase in temperature differential across the compressor is such that the increase is equivalent to less than 5% per year.

8. An apparatus for the gas phase polymerisation of olefins in a fluidised bed reactor having a maximum designed production capacity of C Tonnes/hour, which apparatus comprises:
a) a fluidised bed reaction zone,
b) an outlet located at the top of the reaction zone for withdrawing a first gaseous stream comprising solid particles from the top of the reactor, c) a gas/solids separator for separating solid particles from the first gaseous stream to form a second gaseous stream comprising residual solid particles, d) one or more heat exchangers to which at least a portion of the second gaseous stream is passed, and where no means which completely remove the solids from the second gaseous stream are present between the gas/solids separator and the one or more heat exchangers, and e) a recycle line for recycling at least a portion of the cooled second gaseous stream as the fluidising gas to the fluidised bed reaction zone, wherein the one or more heat exchangers have a heat exchange surface area which totals less than $120 \times C$ m$^2$.

9. A process according to claim 2 wherein the linear velocity of the second gaseous stream through the one or more heat exchangers is at least 5 m/s.

* * * * *